United States Patent [19]

Yasaki et al.

[11] Patent Number: 5,208,206

[45] Date of Patent: May 4, 1993

[54] METHOD OF MANUFACTURING AN EXHAUST GAS PURIFYING CATALYST

[75] Inventors: Shigeru Yasaki; Yasutaka Yoshino, both of Tokyo; Kazunori Ihara, deceased, late of Iwakuni; Kenji Ohkubo, Hiroshima, all of Japan

[73] Assignees: Tokyo Roki Co., Ltd., Kanagawa; Mazda Motor Corporation, Hiroshima, both of Japan

[21] Appl. No.: 675,258

[22] Filed: Mar. 27, 1991

[30] Foreign Application Priority Data

Mar. 30, 1990 [JP] Japan ................................ 2-86768
Nov. 16, 1990 [JP] Japan ................................ 2-312531

[51] Int. Cl.$^5$ .................. B01J 21/04; B01J 23/42; B01J 23/46; B01J 32/00
[52] U.S. Cl. .................. 502/334; 502/439; 423/213.5
[58] Field of Search ................ 502/334, 439; 423/213.5

[56] References Cited

U.S. PATENT DOCUMENTS

| | | | |
|---|---|---|---|
| 3,920,583 | 11/1975 | Pugh | 502/313 X |
| 4,096,095 | 6/1978 | Cairns | 502/314 X |
| 4,279,782 | 7/1981 | Chapman et al. | 252/465 |
| 4,397,770 | 8/1983 | Cairns et al. | 423/213.5 X |
| 4,888,320 | 12/1989 | Ihara et al. | 502/334 X |

FOREIGN PATENT DOCUMENTS 3826155 2/1989 Fed. Rep. of Germany .
58-23138 5/1983 Japan .

*Primary Examiner*—W. J. Shine
*Attorney, Agent, or Firm*—Wenderoth, Lind & Ponack

[57] ABSTRACT

In a method of manufacturing an exhaust gas purifying catalyst, a carrier of heat-resistant alloy steel containing aluminum is initially prepared as a metallic carrier. A first alumina slurry containing fine particles of hydrated alumina and water is then coated on the surface of the metallic carrier and is in turn dried and calcined so that a first alumina layer may be formed on the surface of the metallic carrier. Thereafter, a second alumina slurry containing gamma-alumina particles, hydrated alumina and water is coated on the surface of the first alumina layer and is in turn dried and calcined so that a second alumina layer may be formed on the surface of the first alumina layer.

14 Claims, 4 Drawing Sheets

METHOD OF MANUFACTURING AN EXHAUST GAS PURIFYING CATALYST

BACKGROUND OF THE INVENTION

1. Field of the Invention

The present invention relates to a method of manufacturing an exhaust gas purifying catalyst in which alumina layers supporting therein catalytic metals are formed on the surface of a metallic carrier.

2. Description of the Prior Art

Conventionally, exhaust gas purifying catalysts in which catalytic metals are supported in a honeycomb-like ceramic carrier and those in which catalytic metals are supported in gamma-alumina layers formed on the surface of a metallic carrier are commercially available as exhaust gas purifying catalysts for an automotive internal combustion engine.

Since the latter are superior in opening ratio, geometrical surface area and thermal capacity to the former, the scope of application thereof is gradually increasing.

In the meantime, in the exhaust gas purifying catalysts employing a metallic carrier, when the bonding force between a metallic carrier of stainless steel or the like and alumina layers is not sufficient, the alumina layers supporting catalytic metals tend to be separated during the use for a relatively short period, thus lowering the exhaust gas purifying efficiency. Accordingly, it is necessary to tightly bond the metallic carrier and the alumina layers to each other.

U.S. Pat. No. 4,279,782 discloses a method of coating an oxide whisker-covered surface. In this method, a metallic carrier made of heat-resistant alloy steel containing aluminum is initially subjected to a special heat-treatment so that needle-like whiskers of alumina may be formed on the surface of the metallic carrier. Aqueous alumina gel containing no gamma-alumina particles is then coated on the surface of the metallic carrier, and in a wet state, aqueous alumina gel containing gamma-alumina particles is coated thereon. Thereafter, these gels are dried and calcined.

When the aqueous alumina gel containing no gamma-alumina particles permeates between the whiskers and when the aqueous alumina gel containing gamma-alumina particles is coated thereon, a series of alumina gel matrixes are formed around the gamma-alumina particles and the whiskers. Upon drying and calcining, alumina in the alumina gel matrixes turns into gamma-alumina, which tightly bonds the gamma-alumina particles and the whiskers to each other, thereby strengthening the bonding force between the metallic carrier and the gamma-alumina layers formed on the surface thereof.

Japanese Patent Application (examined) No. 58-23138 discloses a catalyst provided with a metallic carrier, in the surface of which catalytic metals are supported. In this catalyst, oxidation treatment is applied to the surface of a metallic carrier of heat-resistant alloy steel containing aluminum to form an oxide aluminum coating, and alumina layers are then formed thereon.

However, in the method as disclosed in U.S. Pat. No. 4,279,782, it is necessary to make use of a metallic carrier manufactured by a special manufacturing method or to apply a specific heat-treatment to the metallic carrier in order to form alumina whiskers on the surface of the metallic carrier. As a result, the manufacturing cost increases. Furthermore, the metallic carrier and the alumina layers are bonded via a number of alumina whiskers, and when the alumina whiskers are formed on the surface of the metallic carrier, an aluminum oxide coating is also formed thereon. Because of this, there arises the problem of the presence of a limit in enhancing the bonding force between the metallic carrier and the alumina layers.

In the catalyst as disclosed in Japanese Patent Application No. 58-23138, an oxidation treatment process is required to form an aluminum oxide coating on the surface of the metallic carrier. As a result, the number of process increases and the manufacturing cost becomes expensive. Furthermore, after the formation of hydrated alumina on the aluminum oxide coating formed on the surface of the metallic carrier, the hydrated alumina must be dried and calcined to form a gamma-alumina layer. Because of this, there arises the problem of the presence of a limit in enhancing the bonding force between the aluminum oxide coating and the gamma-alumina layer.

SUMMARY OF THE INVENTION

The present invention has been developed to overcome the above-described disadvantages.

It is accordingly an object of the present invention to provide a method of manufacturing an exhaust gas purifying catalyst which is capable of tightly bonding alumina layers on the surface of a metallic carrier through simple processes.

In accomplishing this and other objects, the method according to the present invention comprising:

(a) preparing a carrier of heat-resistant alloy steel containing aluminum as a metallic carrier;

(b) coating a first alumina slurry containing fine particles of hydrated alumina ($Al_2O_3 \cdot H_2O$ or $Al_2O_3 \cdot 3H_2O$) and water on a surface of the metallic carrier;

(c) drying and calcining the first alumina slurry so that a first alumina layer is formed on the surface of the metallic carrier;

(d) coating a second alumina slurry containing gamma-alumina particles, hydrated alumina ($Al_2O_3 \cdot H_2O$ or $Al_2O_3 \cdot 3H_2O$) and water on a surface of the first alumina layer; and (e) drying and calcining the second alumina slurry so that a second alumina layer is formed on the surface of the first alumina layer.

The calcining temperature for calcining the coatings of the first and second alumina slurries after drying is rendered to be lower than a temperature of about 1000° C. at which alpha-alumina is separated out.

It is possible to make use of, as the second alumina slurry, slurry containing various catalytic metals capable of purifying exhaust gases discharged from an automotive internal combustion engine in addition to the above compositions. Alternatively, catalytic metals may be supported in the metallic carrier after drying and calcining the coating of the second alumina slurry.

In the method according to the present invention, the first alumina slurry containing fine particles of hydrated alumina and water is coated on the surface of the metallic carrier of heat-resistant alloy steel containing aluminum and is then dried and calcined. During calcining, a first alumina layer of gamma-alumina is formed of the first alumina slurry, and simultaneously, an alumina coating of gamma-alumina is formed of aluminum contained in the metallic carrier on the surface of the metallic carrier. As a result, the gamma-alumina of the first alumina layer and that of the alumina coating are tightly bonded to each other during the formation thereof. Furthermore, since fine particles of hydrated alumina are used, the gamma-alumina of the first alumina layer is densely formed on the surface of the metallic carrier, thereby enhancing the bonding force between the first alumina layer and the alumina coating.

Subsequently, the second alumina slurry containing gamma-alumina particles, hydrated alumina and water is coated on the surface of the first alumina layer and is then dried and calcined. During calcining, gamma-alumina is formed of hydrated alumina contained in the second alumina slurry between the first alumina layer and the gamma-alumina particles and between individual gamma-alumina particles. By way of this gamma-alumina, not only the first alumina layer and the gamma-alumina particles but individual gamma-alumina particles are tightly bonded to each other. In other words, the gamma-alumina formed of hydrated alumina contained in the second alumina slurry effects the bonding action. After the calcining, the second alumina layer of gamma-alumina is formed on the surface of the first alumina layer and is tightly bonded thereto.

The method according to the present invention requires only simple processes as described above and does not require any special processes, for example a whisker forming process for forming whiskers on the surface of the metallic carrier, an oxidation treatment process for forming an aluminum oxide coating on the surface of the metallic carrier, or the like. Accordingly, alumina layers can be readily economically formed on the surface of the metallic carrier according to the present invention.

BRIEF DESCRIPTION OF THE DRAWINGS

This and other objects and features of the present invention will become more apparent from the following description taken in conjunction with the preferred embodiment thereof with reference to the accompanying drawings, throughout which like parts are designated by like reference numerals, and wherein.

DETAILED DESCRIPTION OF THE PREFERRED EMBODIMENTS

Figure 1:
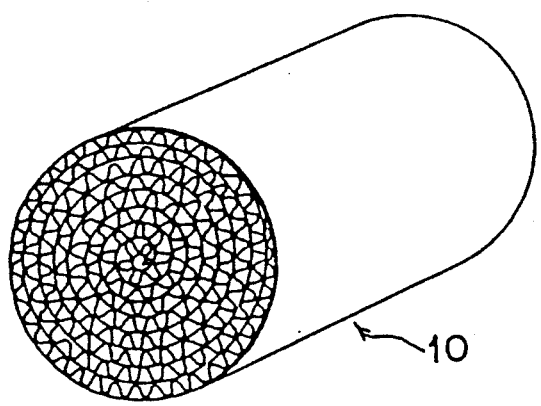
FIG. 1 is a perspective view of a metallic carrier manufactured by a method according to the present invention.

Referring now to the drawings, FIG. 1 depicts a metallic carrier 10 for use in an exhaust gas purifying catalyst (hereinafter referred to as a catalyst unit) for purifying exhaust gases discharged from an automotive internal combustion engine. The metallic carrier 10 was manufactured in a first process.

A thin plate of aluminum-containing ferritic stainless steel (18Cr-3Al) having a thickness of 50 $\mu$m was employed as the metallic carrier 10. The aluminum-containing ferritic stainless steel exhibits superior heat-resistance. Al-plating was first applied to the furface of the stainless steel plate so that the plated layer may be 5 $\mu$m thick. The stainless steel plate was then accommodated in a diffusion furnace, in which a vacuum condition of about $5 \times 10^{-5}$ Torr was established, so as to be subjected to a diffusion treatment at 900° C. for 30 minutes. In this way, Al contained in the Al-plating layer was diffused in a surface layer of the stainless steel plate.

Figure 2:
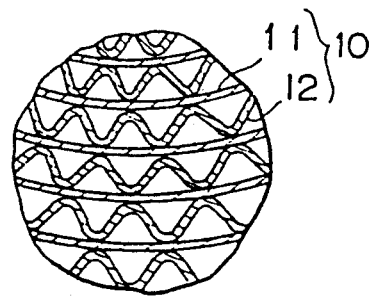
FIG. 2 is a fragmentary sectional view of the metallic carrier of FIG. 1.

Secondly, a flat plate 11 of the above stainless steel plate and a corrugated plate 12 were placed one upon another and scrolled. Thereafter, these plates 11 and 12 were joined to each other through a brazing treatment, and the metallic carrier 10 as shown in FIG. 1 was obtained. The internal structure of the metallic carrier 10 is illustrated in detail in FIG. 2.

It is to be nored that the plates 11 and 12 may be formed into the scrolled structure of FIG. 1 prior to the Al-plating and the diffusion treatment.

In a second process, a first aluminum layer 20 was formed as follows on the surface of the metallic carrier 10 manufactured in the first process.

Hydrated alumina ($Al_2O_3 \cdot 3H_2O$) fine particles of 100 g having a diameter of 5-10 $\mu$m were added to and mixed with water of 500 ml, and an adequate amount of nitric acid was added thereto for concentration adjustment and viscosity adjustment so that the hydrogen ion concentration and the viscosity may be a pH of 4.7 and 0.28 dPa·sec, respectively. Thus, a first alumina slurry was prepared.

Figure 4:
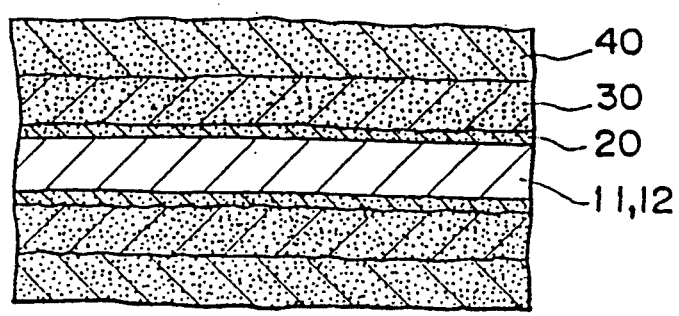
FIG. 4 is a greatly enlarged fragmentary detailed sectional view of the metallic carrier, the two alumina layers and the overcoating layer.

The entire surface of the metallic carrier 10 was coated with the first alumina slurry by dipping the metallic carrier 10 in the first alumina slurry. The metallic carrier 10 was then accommodated in a heating furnace, in which the metallic carrier 10 was dried at 200°-250° C. for two hours and then calcined at 650° C. for two and a half hours. In this way, a first alumina layer 20 of gamma-alumina ($\gamma$-$Al_2O_3$) having a thickness of 3-10 $\mu$m was formed on the surface of the metallic carrier 10, as shown in FIG. 4. The desired amount of the first alumina layer 20 ranges from 2.8% to 3.8% by weight with respect to the metallic carrier 10.

The above metallic carrier 10 contains 3% by weight Al and the surface layer thereof contains high concentration Al diffused from the Al-plating. Accordingly, during calcining, a gamma-alumina coating was formed in the surface layer of the metallic carrier 10 whereas the coating of the first alumina slurry was turned into the first alumina layer of gamma-alumina on the surface of the metallic carrier 10. Since the gamma-alumina coating and the first alumina layer 20 were formed at the same time, the gamma-alumina in the gamma-alumina coating and that in the first alumina layer 20 were tightly bonded to each other during the production processes thereof. As a result, the first alumina layer 20 was tightly bonded to the surface of the metallic carrier 10. In addition, since the hydrated alumina fine particles contained in the first alumina slurry were densely distributed on the surface of the metallic carrier 10 during the calcining, the bonding force between the first alumina layer 20 and the metallic carrier 10 became remarkably strong.

In a third process, a second alumina layer 30 was formed as follows on the surface of the first alumina layer 20 formed on the surface of the metallic carrier 10.

Initially, gamma-alumina particles of 270 g having a diameter of 25–60 μm, hydrated alumina ($Al_2O_3 \cdot 3H_2O$) fine particles of 30 g acting as a binder, and water of 700 ml were mixed together. An adequate amount of nitric acid was added thereto so that the hydrogen ion concentration may range from pH 3.0 to pH 4.5 and the viscosity may range from 0.9 to 1.2 dPa·sec. A second alumina slurry was prepared in this way.

It is noted here that although the relative mixing ratio between the gamma-alumina and the hydrated alumina is generally set to 90:10 by weight, the relative mixing ratio is not limited thereby. The relative mixing ratio between the gamma-alumina and the hydrated alumina may range between 80:20 and 95:5 by weight. More specifically, when the relative ratio of the hydrated alumina acting as a binder is less than 5% by weight (gamma-alumina exceeds 95% by weight), the function of the hydrated alumina as a binder is insufficient. On the other hand, when the relative ratio of the hydrated alumina exceeds 20% by weight (gamma-alumina is less than 80% by.weight), the amount of gamma-alumina becomes relatively small, and therefore, the function of the second alumina layer 30 as a catalyst is lowered.

Subsequently, the metallic carrier 10, on which the first alumina layer 20 was formed, was dipped in the second alumina slurry so that the second alumina slurry may be coated on the surface of the first alumina layer 20. Excessive second alumina slurry was then removed through air-blowing. Thereafter, the metallic carrier 10 having a coating of the second alumina slurry was introduced into a heating furnace, in which the metallic carrier 10 was dried at 250° C. for two hours and calcined at 650° C. for two and a half hours.

In this way, the second alumina layer 30 of gamma-alumina having a thickness of 30–50 μm was formed on the surface of the first alumina layer 20 of the metallic carrier 10. The amount of the second alumina layer 30 was about 21% by weight with respect to the metallic carrier 10.

The second alumina slurry contains fine particles of hydrated alumina. Since the calcining was carried out under the conditions in which the hydrated alumina was filled between the first alumina layer 20 and gamma-alumina particles of the second alumina slurry and between individual gamma-alumina particles, gamma-alumina was formed of the hydrated alumina between the first alumina layer 20 and the gamma-alumina particles and between the individual gamma-alumina particles. As a result, the first alumina layer 20 and the gamma-alumina particles were tightly bonded to each other, and likewise, the individual gamma-alumina particles were tightly bonded to each other. Thus, the gamma-alumina formed of the hydrated alumina contained in the second alumina slurry exhibited the bonding function, and after calcining, the second alumina layer 30 tightly bonded thereto was formed on the surface of the first alumina layer 20.

In a fourth process, catalytic metals were supported as follows in the first and second alumina layers 20 and 30 of the metallic carrier 10.

Initially, a catalytic metal ion solution containing Pt and Rh as exhaust gas purifying catalytic metals, for example a mixed solution of platinum chloride and rhodium chloride containing Pt of 1.333 g/l and Rh of 0.267 g/l, was prepared. This solution was then accommodated in a Petri dish and the metallic carrier 10 having the first and second alumina layers 20 and 30 was dipped therein. Thereafter, the metallic carrier 10 was introduced into a heating furnace, in which the metallic carrier 10 was dried at 200°–250° C. for two hours and calcined at 650° C. for two and a half hours.

In this way, the catalytic metals Pt and Rh were supported in the first and second alumina layers 20 and 30 formed on the surface of the metallic carrier 10.

In a fifth process, an overcoating layer 40 was formed as follows on the surface of the second alumina layer 30 of the metallic carrier 10.

Initially, cerium oxide ($CeO_2$) of 270 g, hydrated alumina ($Al_2O_3 \cdot 3H_2O$) of 30 g acting as a binder, and water of 700 ml were mixed together. An adequate amount of nitric acid was added thereto so that the hydrogen ion concentration may range from pH 3.0 to pH 4.5 and the viscosity may range from 0.9 to 1.2 dPa·sec. An overcoating slurry was prepared in this way.

It is noted here that although the relative mixing ratio between cerium oxide and hydrated alumina is generally set to 90:10 by weight, the relative mixing ratio is not limited thereby. The relative mixing ratio between cerium oxide and hydrated alumina may range between 80:20 and 95:5 by weight. As similar to the second alumina layer 30, the hydrated alumina acts as a binder for the cerium oxide in the overcoating layer 40. If the relative ratio of the hydrated alumina is less than 5% by weight (cerium oxide exceeds 95% by weight), the function of the hydrated alumina as a binder is insufficient. On the other hand, if the relative ratio of the hydrated alumina exceeds 20% by weight (cerium oxide is less than 80% by weight), the function of the cerium oxide for expediting oxidation and reduction is lowered as described later.

Subsequently, the metallic carrier 10, on which the first and second alumina layers 20 and 30 were formed, was dipped in the overcoating slurry so that the overcoating slurry may be coated on the surface of the second alumina layer 30. Excessive overcoating slurry was then removed through air-blowing. Thereafter, the metallic carrier 10 coated with the overcoating slurry was introduced into a heating furnace, in which the metallic carrier 10 was dried at 250° C. for two hours and calcined at 650° C. for two and a half hours.

In this way, an overcoating layer 40 mainly composed of cerium oxide and having a thickness of 30–50 μm was formed on the surface of the second alumina layer 30 of the metallic carrier 10. The amount of the overcoating layer 40 was about 21% by weight with respect to the metallic carrier 10.

The gamma-alumina formed of the hydrated alumina during the calcining exhibited bonding properties for the cerium oxide, as similar to the second alumina layer 30.

Cerium oxide ($C_eO_2$) has a characteristic of absorbing oxygen when the oxygen concentration in exhaust gases is high and that of discharging oxygen when the oxygen concentration in exhaust gases is low. Because of this, cerium oxide causes a catalyst unit to expedite oxidizing and reducing reactions during purification of exhaust gases by regulating the oxygen concentration.

Figure 3:
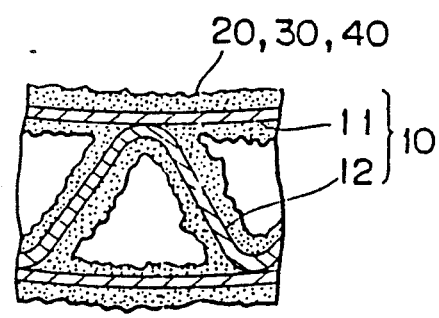
FIG. 3 is an enlarged fragmentary sectional view of the metallic carrier of FIG. 1 having two alumina layers and an overcoating layer.

The above-described first to fifth processes could make it possible to manufacture practically serviceable catalyst units. FIG. 3 depicts an enlarged cross section of one of such catalyst units.

The above-described method of manufacturing a catalyst unit is further discussed hereinafter with reference to several experimental results.

Figure 5:
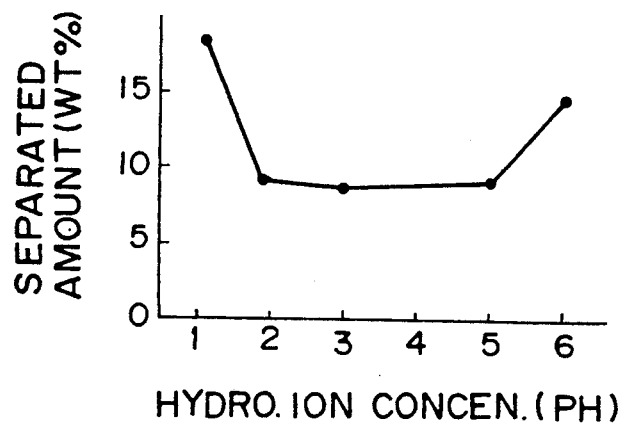
FIG. 5 is a graph indicative of the relationship between the hydrogen ion concentration of a first alumina slurry and the separated amount of W/C coatings.

(A) FIG. 5 is a graph indicative of experimental results in connection with the relationship between the hydrogen ion concentration pH of the first alumina slurry prepared in the second process and the separated amount of the first and second alumina layers 20 and 30 and the overcoating layer 40. These three layers are hereinafter referred to as W/C coatings. Separation tests were carried out by dipping samples in a bath of a supersonic cleaner for thirty minutes. The separated amount was obtained by the following equation.

Separated Amount =

$$100 \times \frac{W/C \text{ coatings before expt} - W/C \text{ coatings after expt}}{W/C \text{ coatings before expt}}$$

As shown in the graph of FIG. 5, when the pH is less than 1.9 or greater than 5.0, the separated amount rapidly increases. Furthermore, when the pH becomes less than 1.9, the problem of acid corrosion would occur. The pH value of the first alumina slurry, therefore, should be preferably set to 1.9–5.0.

Figure 6:
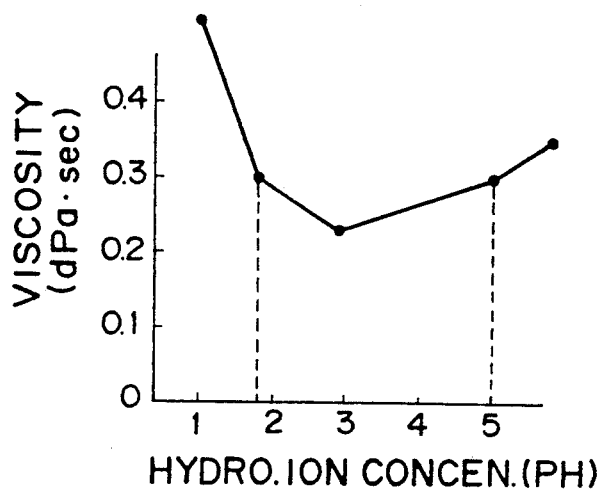
FIG. 6 is a graph indicative of the relationship between the hydrogen ion concentration and the viscosity of the first alumina slurry.

(B) FIG. 6 is a graph indicative of the relationship between the hydrogen ion concentration pH and the viscosity of the first alumina slurry. When the hydrogen ion concentration is high or low, the viscosity increases. As the viscosity of the first alumina slurry increases, the first alumina layer 20 becomes thicker. Accordingly, it is preferable to set the viscosity of the first alumina slurry to an appropriate value by regulating the amount of nitric acid to be added thereto. As shown in the graph of FIG. 6, when the pH value is 1.9–5.0, the viscosity is 0.23–0.30 dPa·sec.

Figure 7:
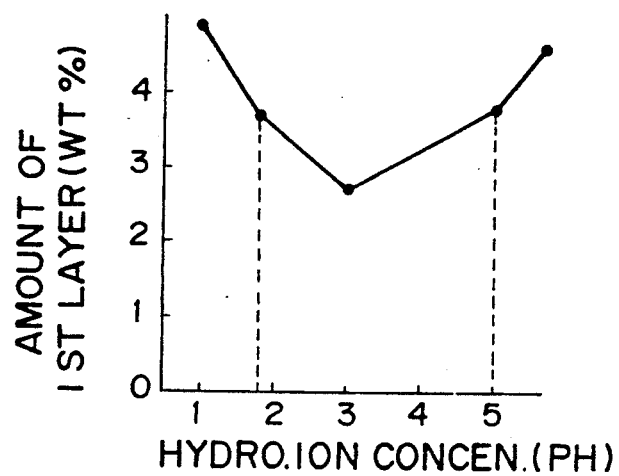
FIG. 7 is a graph indicative of the relationship between the hydrogen ion concentration of the first alumina slurry and the amount of the first alumina layer.

(C) FIG. 7 is a graph indicative of the relationship between the hydrogen ion concentration pH of the first alumina slurry and the amount by weight of the first alumina layer 20 with respect to the metallic carrier 10.

When the pH value becomes less than 1.9 or greater than 5.0, the viscosity increases and the first alumina layer 20 becomes thicker. As a result, it is likely that this layer would be easily separated. When the pH value ranges from 1.9 to 5.0, the amount of the first alumina layer 20 ranges from 2.8% to 3.8% by weight with respect to the metallic carrier 10. This range is considered preferable.

If the first alumina layer 20 exceeds 10 μm in thickness, the W/C coating layers are liable to be separated. On the other hand, if the first alumina layer 20 is less than 3 μm in thickness, the bonding between the metallic carrier 10 and the W/C coating layers becomes weak, thus causing the separation. Accordingly, the preferable thickness of the first alumina layer 20 is 3–10 μm.

Figure 8:
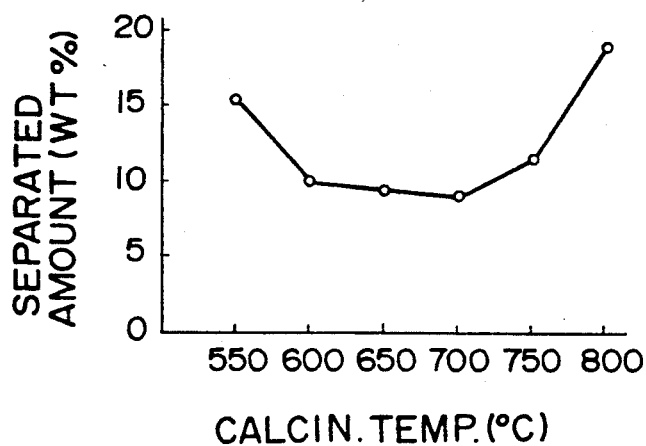
FIG. 8 is a graph indicative of the relationship between the calcining temperature and the separated amount of the W/C coatings.

(D) FIG. 8 is a graph indicative of the relationship between the calcining temperature at the time the coating of the first alumina slurry was calcined and the separated amount of the W/C coatings.

When the calcining temperature is less than 600° C., it seems to be difficult for the hydrated alumina in the first alumina slurry to sufficiently turn to the gamma-alumina. Therefore, it is considered that the bonding force between the gamma-alumina coating formed in the surface of the metallic carrier 10 and the first alumina layer 20 becomes weak. On the other hand, when the calcining temperature is greater than 700° C., Al contained in the metallic carrier 10 easily turns to the gamma-alumina coating. Because of this, it is considered that the gamma-alumina coating becomes thick and tiny cracks would occur in the gamma-alumina coating, thereby reducing the bonding force between the first alumina layer 20 and the metallic carrier 10.

The preferable range in the calcining temperature at the time the coating of the first alumina slurry is calcined is about 600°–700° C.

(E) Reasons for limiting the manufacturing conditions of the first alumina layer 20 in the second process are generally applicable to the manufacturing conditions of the second alumina layer 30 in the third process. In view of this, the preferable manufacturing conditions for the second alumina layer 30 are described hereinafter.

Manufacturing Conditions of 2nd Alumina Layer pH of Slurry: 3–4.5
Viscosity of Slurry: 0.9–1.2 dPa·sec
W/C Coatings: 19–23% by weight (with respect to the metallic carrier)
Drying Temp.: 250°±30° C.
Calcining Temp.: 600°–700° C.
Thickness of Alumina Layer: 30–50 μm As described previously, the preferable relative mixing ratio between gamma-alumina and hydrated alumina in the second alumina slurry ranges between 80:20 and 95:5 by weight.

(F) Reasons for limiting the manufacturing conditions of the second alumina layer 30 in the third process are generally applicable to the manufacturing conditions of the overcoating layer 40 in the fifth process. In view of this, the preferable manufacturing conditions for the overcoating layer 40 are described hereinafter.

Manufacturing Conditions of Overcoating Layer pH of Slurry: 3–4.5
Viscosity of Slurry: 0.9–1.2 dPa·sec
W/C Coatings: 19–23% by weight (with respect to the metallic carrier)
Drying Temp.: 250°±30° C.
Calcining Temp.: 600°–700° C.
Thickness of Alumina Layer: 30–50 μm As described previously, the preferable relative mixing ratio between cerium oxide and hydrated alumina in the overcoating slurry ranges between 80:20 and 95:5 by weight.

Figure 9:
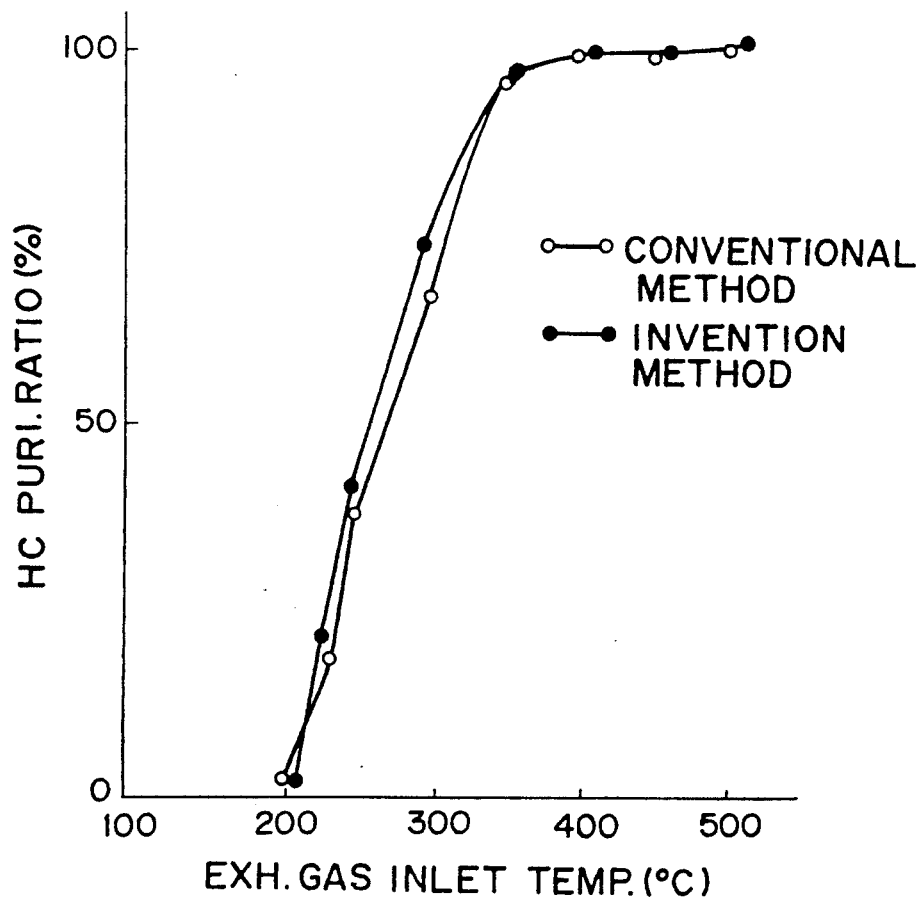
FIG. 9 is a graph indicative of the relationship between the HC purifying ratio and the exhaust gas inlet temperature.

(G) FIG. 9 is a graph indicative of results of HC purifying experiments, which were carried out with respect to the catalyst unit manufactured by the method of the present invention as discussed in the first to fifth processes and a whisker type catalyst unit manufactured in a conventional method as disclosed in U.S. Pat. No. 4,279,782. As is clear from these experimental results, the catalyst unit according to the present invention has substantially the same HC purifying performance as the whisker type catalyst unit.

A ferritic stainless steel plate as employed in the present invention was used as a metallic carrier of the whisker type catalyst unit and was subjected to an Al plating (5 µm) treatment and a diffusion treatment (900° C×30 min. under vacuum). This metallic carrier was heat-treated in air at 950° C. for six hours so that alumina whiskers may be formed on the surface thereof. Thereafter, a base coating layer containing 21% by weight gamma-alumina with respect to the metallic carrier was formed on the surface of the metallic carrier. Furthermore, as similar to the present invention, catalytic metals of Pt and Rh were supported in the base coating layer and an overcoating layer was formed on the surface of the base coating layer. The overcoating layer was mainly composed of $C_eO_2$ and was 21% by weight with respect to the metallic carrier. Prior to the experiments, both the catalyst unit according to the present invention and the whisker type catalyst unit were subjected to an aging treatment in air at 900° C. for fifty hours after the manufacture thereof.

Figure 10:
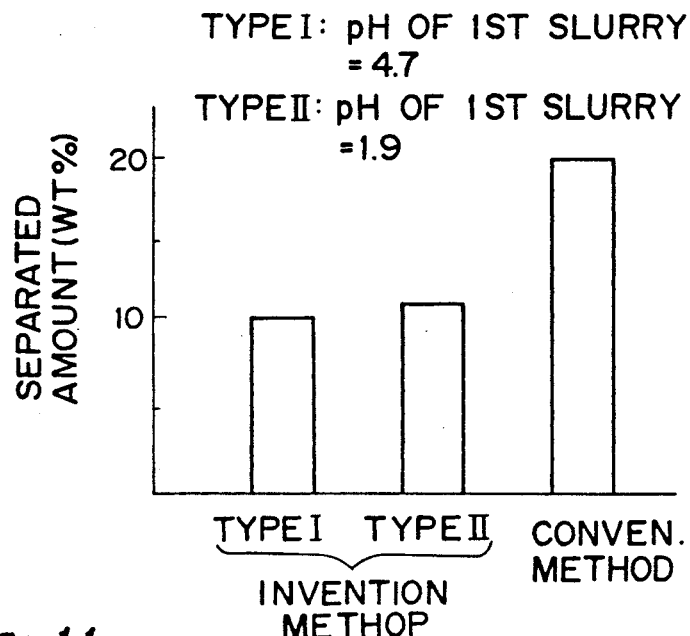
FIG. 10 is a graph indicative of the separated amount of W/C coatings of various catalyst units including a catalyst unit manufactured by the method according to the present invention.

(H) FIG. 10 is a graph indicative of results of W/C coating separation experiments with respect to the catalyst unit according to the present invention and the whisker type catalyst unit. As is clear from this graph, the separated amount in the catalyst unit according to the present invention is reduced to approximately half as compared with the whisker type catalyst unit. It is, therefore, known that the metallic carrier 10 and the W/C coatings are tightly bonded to each other.

Figure 11:
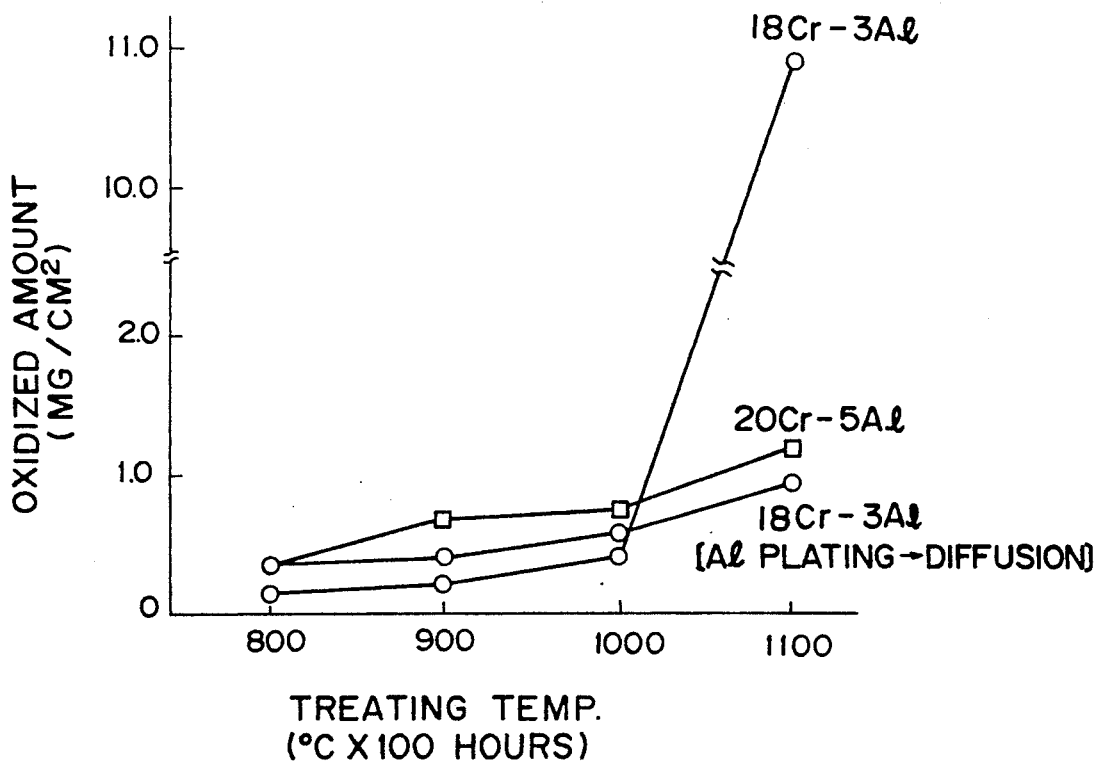
FIG. 11 is a graph indicative of the relationship between the oxidized amount and the heat-treating temperature of various stainless steels.

(I) FIG. 11 is a graph indicative of results of experiments in which oxidation resistance was investigated with respect to the ferritic stainless steel plate suited for the metallic carrier 10.

It is known from this graph that the Al plating can improve the oxidation resistance at a temperature over 1000° C.

Any heat-resistant alloy steels containing Al can be used as a material of the metallic carrier 10. A ferritic stainless steel containing 3-7% by weight Al and 15-24% by weight Cr is preferably used.

Figure 12:
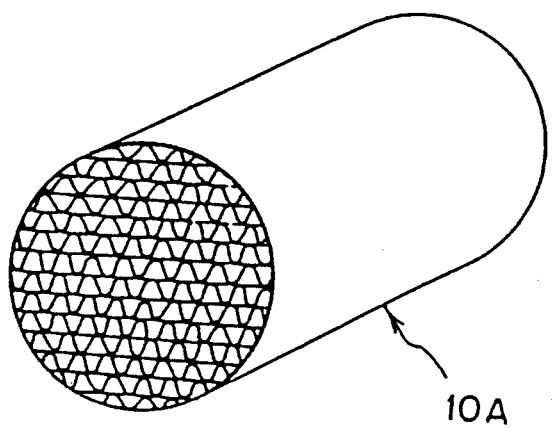
FIG. 12 is a view similar to FIG. 1 according to a modification of the present invention.

A metallic carrier 10A having the construction as shown in FIG. 12 can also be employed. Any other similar construction in which the surface area is geometrically increased, for example a honeycomb-like construction, may also be employed.

It is noted here that the above-described composition of the first and second alumina slurries shows only one example and is not limited thereby. Any slurry containing an adequate amount of hydrated alumina fine particles in addition to water can be used as the first alumina slurry while any slurry containing an adequate amount of gamma-alumina particles and an adequate amount of hydrated alumina in addition to water can be used as the second alumina slurry. $Al_2O_3 \cdot H_2O$ may be substituted for $Al_2O_3 \cdot 3H_2O$ for use as hydrated alumina. Hydrated alumina may contain both $Al_2O_3 \cdot 3H_2O$ and $Al_2O_3 \cdot H_2O$.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A method of manufacturing an exhaust gas purifying catalyst support comprising the steps of:
   preparing a carrier of heat-resistant alloy steel containing aluminum as a metallic carrier;
   coating a first alumina slurry containing fine particles of hydrated alumina and water on a surface of said metallic carrier;
   drying and calcining said first alumina slurry at 600° to 700° so that a first alumina layer is formed on the surface of said metallic carrier;
   coating a second alumina slurry containing gamma-alumina particles, hydrated alumina and water on a surface of said first alumina layer; and
   drying and calcining said second alumina slurry so that a second alumina layer is formed on the surface of said first alumina layer.

2. The method according to claim 1, wherein said hydrated alumina of said first alumina slurry has a particle diameter of 5-10 µm.

3. The method according to claim 1, wherein a hydrogen ion concentration of said first alumina slurry ranges from pH1.9 to pH 5.0.

4. The method according to claim 1, wherein a viscosity of said first alumina slurry ranges from 0.23 to 0.30 dPa·sec.

5. The method according to claim 1, wherein a drying temperature of said first alumina slurry ranges from 200° to 250° C.

6. The method according to claim 1, wherein said hydrated alumina of said first alumina slurry has a particle diameter of 5-10 µm, and wherein a hydrogen ion concentration and a viscosity of said first alumina slurry ranges from pH 1.9 to pH 5.0 and from 0.23 to 0.30 dPa·sec, respectively.

7. The method according to claim 1, wherein said gamma-alumina of said second alumina slurry has a particle diameter of 25-60 µm.

8. The method according to claim 7, wherein a hydrogen ion concentration and a viscosity of said second alumina slurry ranges from pH 3.0 to pH 4.5 and from 0.9 to 1.2 dPa·sec, respectively.

9. The method according to claim 1, further comprising the steps of:
   coating an overcoating slurry containing cerium oxide, hydrated alumina and water on the surface of said metallic carrier; and
   drying and calcining said overcoating slurry so that an overcoating layer is formed on a surface of said second alumina layer.

10. The method according to claim 9, wherein a hydrogen ion concentration and a viscosity of said overcoating slurry ranges from pH 3.0 to pH 4.5 and from 0.9 to 1.2 dPa·sec, respectively.

11. The method according to claim 1, wherein said metallic carrier is made of ferritic stainless steel.

12. The method according to claim 1, further comprising the step of aluminum-plating and a diffusion treatment under vacuum prior to the step of coating said first alumina slurry.

13. The method according to claim 1, further comprising the step of supporting catalytic metals on the surface of said metallic carrier.

14. The method according to claim 13, wherein said catalytic metals comprise platinum and rhodium.

* * * * *